United States Patent
Lesaffre

(10) Patent No.: US 10,200,779 B2
(45) Date of Patent: Feb. 5, 2019

(54) AUDIO FORWARDING DEVICE AND CORRESPONDING METHOD

(71) Applicant: KONINKLIJKE PHILIPS N.V., Eindhoven (NL)

(72) Inventor: Kristof Paula A. Lesaffre, Mechelen (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 141 days.

(21) Appl. No.: 14/423,314

(22) PCT Filed: Aug. 8, 2013

(86) PCT No.: PCT/IB2013/056492
§ 371 (c)(1),
(2) Date: Feb. 23, 2015

(87) PCT Pub. No.: WO2014/033570
PCT Pub. Date: Mar. 6, 2014

(65) Prior Publication Data
US 2015/0208161 A1    Jul. 23, 2015

Related U.S. Application Data

(60) Provisional application No. 61/693,833, filed on Aug. 28, 2012.

(51) Int. Cl.
*H04R 1/10* (2006.01)
*H04N 21/8547* (2011.01)
(Continued)

(52) U.S. Cl.
CPC ....... *H04R 1/1091* (2013.01); *H04N 21/4126* (2013.01); *H04N 21/41415* (2013.01);
(Continued)

(58) Field of Classification Search
None
See application file for complete search history.

(56) References Cited

U.S. PATENT DOCUMENTS 6,665,000 B1 * 12/2003 Buehler ................ H04N 7/148
348/14.02
8,731,370 B2 * 5/2014 Heinmiller ............ G11B 27/10
386/248
(Continued)

FOREIGN PATENT DOCUMENTS

EP    2063662    5/2009

OTHER PUBLICATIONS

IEEE 802.11b Standard. 1999, 97 Page Document.
(Continued)

*Primary Examiner* — Thomas Maung
*Assistant Examiner* — Qin Zhu

(57) ABSTRACT

An audio forwarding device includes a media interface that is configured to receive a media stream, the media stream includes a video stream and an audio stream, the audio stream being synchronized with the video stream. A display interface is configured to transmit the video stream to a display for display of the video stream, and a wireless data network interface is configured to stream the audio stream in the form of digital data to a mobile computing device over a digital wireless data connection for the mobile computing device to play the audio stream on a headphone interface.

10 Claims, 8 Drawing Sheets

(51) Int. Cl.
  *H04N 21/41* (2011.01)
  *H04N 21/436* (2011.01)
  *H04N 21/43* (2011.01)
  *H04N 21/414* (2011.01)
  *H04N 21/439* (2011.01)

(52) U.S. Cl.
  CPC ....... *H04N 21/4307* (2013.01); *H04N 21/439* (2013.01); *H04N 21/43615* (2013.01); *H04N 21/8547* (2013.01); *H04R 2420/07* (2013.01)

(56) References Cited

U.S. PATENT DOCUMENTS

| | | | |
|---|---|---|---|
| 2004/0068482 A1* | 4/2004 | Yoshida | H04N 5/04 |
| 2004/0205214 A1* | 10/2004 | Bång | H04N 21/4341 |
| | | | 709/231 |
| 2005/0213593 A1* | 9/2005 | Anderson | H04L 29/06027 |
| | | | 370/419 |
| 2006/0140265 A1 | 6/2006 | Igler et al. | |
| 2008/0131076 A1 | 6/2008 | Hashimoto | |
| 2008/0138032 A1* | 6/2008 | Leyendecker | H04N 5/04 |
| | | | 386/326 |
| 2008/0194209 A1* | 8/2008 | Haupt | H04H 20/63 |
| | | | 455/73 |
| 2009/0073316 A1* | 3/2009 | Ejima | H04N 5/04 |
| | | | 348/515 |
| 2009/0091655 A1 | 4/2009 | Russell | |
| 2009/0135300 A1* | 5/2009 | Suzuki | H04N 5/04 |
| | | | 348/515 |
| 2009/0207306 A1* | 8/2009 | Hagg | H04N 5/04 |
| | | | 348/512 |
| 2009/0274326 A1* | 11/2009 | Jia | H04J 3/0682 |
| | | | 381/311 |
| 2012/0154679 A1* | 6/2012 | Pendarvis | H04N 21/4307 |
| | | | 348/512 |
| 2012/0200774 A1 | 8/2012 | Ehlers, Sr. | |
| 2012/0206557 A1* | 8/2012 | Ridges | H04N 21/41407 |
| | | | 348/14.02 |

OTHER PUBLICATIONS

ISO/IEC 13818-1 International Standard, "Information Technology-Generic Coding of Moving Pictures and Associated Audio Information: Systems"; 2000, 174 Page Document.

* cited by examiner

AUDIO FORWARDING DEVICE AND CORRESPONDING METHOD

CROSS-REFERENCE TO PRIOR APPLICATIONS

This application is the U.S. National Phase application under 35 U.S.C. § 371 of International Application No. PCT/IB2013/056492, filed on Aug. 8, 2013, which claims the benefit of U.S. Provisional Patent Application No. 61/693,833, filed on Aug. 28, 2012. These applications are hereby incorporated by reference herein.

FIELD OF THE INVENTION

The invention relates to an audio forwarding device comprising a media interface configured to receive a media stream, the media stream comprising a video stream and an audio stream, the audio stream being synchronized with the video stream, a display interface configured to transmit the video stream to a display for display of the video stream.

The invention further relates to a method for audio forwarding comprising and corresponding software.

BACKGROUND OF THE INVENTION

Home entertainment system usually consist of three components, a media source for producing content, a display for displaying video and external loudspeakers for playing the corresponding audio.

The audio however may disturb people who currently are not interested in watching television. Whereas people may avoid watching the screen, this is not possible with the audio without leaving the room. With the advent of personal media more and more people are busy with their private entertainments and do not necessarily watch the same display. There is thus a need to better control the distribution of audio that corresponds to video which is displayed on a display.

It is noted that the existing ways to receive the audio on a headphone that corresponds to the video are limited and inflexible. The television set may provide one or more audio jacks to which an headphone may be connected. Although this solves the direct problem of transferring audio from the display to a user, it leaves much to be desired.

SUMMARY OF THE INVENTION

It would be advantageous to have an improved audio forwarding device. The audio forwarding device comprises a media interface configured to receive a media stream, the media stream comprising a video stream and an audio stream, the audio stream being synchronized with the video stream, a display interface configured to transmit the video stream to a display for display of the video stream, and a wireless data network interface configured to stream the audio stream in the form of digital data to a mobile computing device over a digital wireless data connection for the mobile computing device to play the audio stream on a headphone interface.

The audio forwarding device allows a user to watch a video stream on a display while listening to the corresponding audio from a mobile computing device. The display and mobile computing device are different devices. The user may have a headphone connected to the headphone interface of the mobile computing device. This allows the audio to be consumed in a private manner. The mobile computing device may be a tablet, or mobile phone, in particular a smart phone. The user may use the smart phone to wirelessly listen to the audio channel of a home entertainment system. Many people have a smart phone. Each smart phone user can now listen to audio wirelessly without the need of buying separate wireless headphones.

This has the advantage that the audio does not disturb anyone; in particular if the display is configured not to play the audio stream. For example, the audio forwarding device may be configured not to forward the audio stream to the display, thus avoiding the playing of the audio over the display altogether. Typically, the display will be a television.

It is also possible to configure the display to play the audio stream at a different sound level, say volume, than the mobile computing device. In this case the audio forwarding device also forwards the audio stream to the display. For example, the mobile computing device may comprise a volume control and an amplifier. Traditionally, the volume level of the external loudspeakers is the same for all the users that are using a home entertainment system. However, the audio forwarding device allows people with hearing loss to listen to the audio stream privately at a higher sound level. The mobile computing device may even be integrated in an electronic hearing loss aid. Listening through the external loudspeakers and the wireless headset simultaneously, allows people with hearing disabilities to select a personal volume level. Thus people with hearing loss, even if so slight as to not yet warrant a hearing loss aid, may continue to watch television with their family, yet at a volume setting with is comfortable both for family members without hearing loss, who will listen to the audio stream using loudspeakers, e.g., of the display, and of those with hearing loss who may listen via their smart phone. The mobile computing device may also be referred to as a mobile digital data processing device configured for wireless communication.

The media interface may be configured to receive the media stream as analog audio and video but preferably as a digital media stream. For example, the media stream may be streamed over the Internet Protocol (IP). The media stream may be obtained over HDMI. The media stream interface corresponds to the way the media stream is presented For example, the media stream interface may be an HDMI port, USB port, Ethernet port and the like. A media stream source, say a Blu-ray player may be combined, with the audio forwarder; e.g., an optical disk player, such as Blu-ray may be comprised in the audio forwarder. Preferably, the audio and video are synchronized with each other in the media source.

Synchronization need not be perfect, neither the synchronization between audio and video stream received at the media stream interface, nor during display of the video stream and audio stream. It is sufficient if the synchronization is sufficient not to annoy the user, or more preferably not to be noticed. Preferably, the playing of the audio stream is synchronized with the displaying of the video stream. In an embodiment, the relative timing between the playing of the audio stream and of displaying of the video compared to the synchronization as received on the media interface remains within predetermined bounds. For example, the relative timing of the audio and video stream should be within +40 ms and −60 ms (audio before/after video, respectively). More preferably, the difference between the audio stream and the video stream should be within +5 ms and −15 ms.

The audio stream may be obtained from the media stream in at least two different ways. Note that the audio stream is obtained separate from the video stream; this allows transmission of the audio stream without also transmitting the video stream. First of all, the audio stream may be obtained from the media stream. For example, the audio forwarding device may comprise an audio separator configured to obtain the audio stream from the media stream separate from the video stream. For example, the media stream may comprise packetized audio and video streams, possibly with error correction and/or stream synchronization features for maintaining transmission integrity even if the signal is degraded, e.g., the media stream may be an MPEG transport stream, e.g., according to ISO/IEC standard 13818-1.

The audio stream may also be received from the display. For example, the audio forwarding device may comprise an audio receiving interface or receiving from the display the audio stream obtained by the display from the media stream separate from the video stream, the received audio stream being received synchronized with the video stream while being displayed on the display. This has the advantage that no compensation is needed for delay introduced by the display, e.g., for processing of the video, e.g., image improvements, on the other hand this has the disadvantage that no compensation is possible for the delay in the wireless communication. However, the delay caused by transmission over a wireless connection would in good circumstance be low enough, and even in a situation with occasional re-transmission, would still typically be below 25 ms. This means that in this situation the synchronization between video and audio may still be retained. In fact even if 30 ms of buffering is introduced in the mobile computing device and a bad, delays will typically meet the 60 ms limit.

The display is typically a television. For example, if the television is placed in the center of a living room. Some or all members of the family may watch the same video yet with audio settings of their own preference, e.g., volume, language settings, and/or audio profiles, such as equalizer settings.

The wireless data network interface may be configured for a wireless LAN, e.g. Wi-Fi. The wireless data network interface may be configured for a packetized digital data transmission. The wireless data network interface may be configured for the IEEE 802.11b-1999 standard. For example, the wireless data network interface may use so-called phase-shift keying (PSK) for encoding of digital information in a wireless signal rather than say, frequency shift keying (FSK).

The mobile computing device may be mobile phone, e.g., a smart phone, or tablet and the like. The mobile computing device comprises an interface for a headphone. The headphone may place loudspeakers in the vicinity of the ear by a headband. The headphone may be of ear phone type, which place loudspeaker in the ear itself. The headphone may be a headset. The headphone may be a hearing aid. The mobile computing device typically comprises electronic memory for storing computer code, e.g. an 'app', and processor for executing said computer code. The computer code is configured to receive the audio stream and play it to the headphone interface. The app may also perform synchronization. For example, the mobile computing device may delay the audio to compensate for delays in the display. For example, the mobile computing device may use other synchronization data.

Preferably, the private audio stream played at the mobile computing device is in sync with the video stream displayed at the display. For example, the synchronization present in the media stream is preserved at least to an extent when playing the video and audio streams at different places. If the audio stream is also played at the display then the audio stream played at the external loudspeakers, e.g., loudspeakers of the display, is in sync with the audio stream played at the mobile computing device.

For example, the audio forwarding device may comprise a delay value interface configured to receive from the display a delay value in digital form, representing the delay between receiving the video stream by the display and displaying the video stream on the display. The delay value may be transmitted to the mobile computing device; for example the wireless data network interface may be configured to forward the delay value to the mobile computing device, so that the mobile computing device may use an audio delayer to delaying playing of the audio stream to synchronize with the display of the video stream. The delay value may also be used at the audio forwarding device itself to delay the wireless transmitting of the audio.

Also the delay introduced by the wireless transmission to the mobile computing device and possibly processing of the audio at the mobile computing device may be determined. For example, the audio forwarding device and mobile computing device may be configured to perform a delay determining protocol to establish a wireless delay value. The delay of the audio may then be reduced to the delay value of the display minus the determined wireless delay value. For example, the wireless delay value may be an average delay. For example, the delay value may be half of a round trip time.

The audio forwarding device may comprise a synchronizer configured to produce a synchronizing data stream for synchronizing the audio stream during playing on the mobile computing device with the displaying of the video stream on the display, the wireless data network interface being configured to stream the synchronizing data stream to the mobile computing device over the digital wireless data connection together with the audio stream.

The synchronizing data may be streamed to the mobile computing device and possibly also to the display. The synchronizing data may also be streamed only to the mobile computing device, e.g., together with a delay value of the display. The display will generally have a more constant delay. For example, the synchronizing data stream may comprise timestamps. The audio forwarding device and the mobile computing device may execute a protocol to synchronize their clocks. Avoiding sending the synchronization data to the display has the advantage that the audio forwarder will be compatible with more displays. The mobile computing devices on the other are easier to upgrade, e.g., by downloading new software. Furthermore, since delay of displays is generally more constant it is not always needed to send synchronization data, instead a delay value may be obtained from the display. Note that the delay value may also be determined from other sources. For example, the delay value may be obtained from a standard, say fixed at 30 ms, or entered by the user, etc.

The media stream may comprise multiple audio streams, each audio stream being synchronized with the video stream, the wireless data network interface is configured to stream the multiple audio streams in the form of digital data to the mobile computing device over the digital wireless data connection, the mobile computing device being configured to select an audio stream from the multiple audio streams for playing on the headphone interface. It is also possible for the audio forwarding device to send two different audio streams to two different mobile computing devices. It is also possible for the audio forwarding device to use a wireless broadcasting protocol to send the one or multiple audio streams to the multiple mobile computing devices.

Streaming multiple audio channels to different smart phones allows for private audio streams (e.g. each user listens to an audio channel in his/her own language). Some users like to watch a movie with a comment track, while others prefer the original soundtrack. Traditionally, only one audio stream is rendered when playing back content on the home entertainment system, even when using headphones. This obliges the user to select one single language. The audio forwarding device may have a selector for selecting which one or more of the audio streams to forward to the one or more mobile computing devices. The selector may receive input from the user or users of the mobile computing devices, e.g., through wireless communication.

The audio forwarding device may allow multiple audio streams to be sent to multiple smart phones simultaneously. People could watch the same TV screen and get different audio feeds. Furthermore, everyone watches the same video stream on the same display that is synced to their audio.

The audio forwarding device may be comprised in the display.

An aspect of the invention concerns an audio/video system comprising a media source for producing a media stream comprising a video stream and an audio stream, the audio stream being synchronized with the video stream, an audio forwarding device configured to receive the media stream from the media source at the media interface of the audio forwarding device, a display configured to receive the video stream from the display interface of the audio forwarding device for display of the video stream, and a mobile computing device comprising a wireless data network interface for receiving the audio stream from the audio forwarding device, and a headphone interface for connecting a headphone to the mobile computing device, an audio player for obtaining the audio stream from the wireless data network interface of the mobile computing device and for playing the audio stream on the headphone interface.

The invention allows streaming of the audio of a home entertainment system to smart phones in sync with the video stream displayed on the (TV) screen.

In an embodiment, a home entertainment system sends the audio channel wirelessly using Wi-Fi technology. A smart phone app receives the Wi-Fi audio stream and allows playback of this stream on the smart phone. The audio channel played back on the smart phone is synced with the video channel played back on the TV or other display screen. To achieve this, the delays of sending the audio signal over Wi-Fi and the delays caused by video processing are calculated and compared to each other.

Streaming of audio content to a mobile device in sync with a video stream shown on display, e.g. a main (TV) screen, allows users to share a television while enjoying private audio. For the user, they may only need to install computer code on their mobile computing device, e.g. download an app, which enables the mobile device to connect with the audio forwarding device, to receive and audio stream therefrom, and to play it to a headphone. The computer code may in addition perform such services as synchronizing, volume control, language selection, and the like.

The audio forwarding device is an electronic device it may be a set-top box, computer, television, optical disc player and the like.

An aspect of the invention concerns a method for audio forwarding comprising receiving a media stream, the media stream comprising a video stream and an audio stream, the audio stream being synchronized with the video stream, transmitting the video stream to a display for display of the video stream, and streaming the audio stream in the form of digital data to a mobile computing device over a digital wireless data connection.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

It is noted that known wireless headphones also have the advantage of a private listening experience (not disturbing anyone) and possibly private volume settings. They however need to be bought separately and are quite expensive, do not allow multiple headsets to be used at the same time, and require connecting to an audio jack of the home entertainment system, thus only one or a small number of headphone may be used.

However, by using a wireless data network interface in a mobile computing device, the connection between audio forwarding device and headphone does not run via an audio jack, this simplifies the connections, allows multiple connections, and does not require an additional wireless system in the household.

BRIEF DESCRIPTION OF THE DRAWINGS

These and other aspects of the invention are apparent from and will be elucidated with reference to the embodiments described hereinafter. In the drawings.

Figure 1:
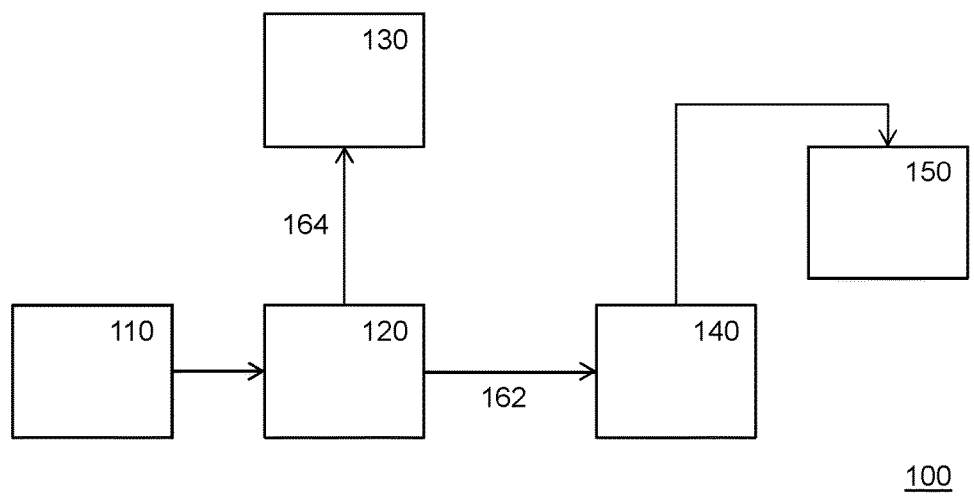
FIGS. 1-7 are block diagrams illustrating an audio/video system.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

100-107 an audio/video system
110 a media stream source
120 an audio forwarding device
122 a media interface
124 a display interface
126 a wireless data network interface
128 an audio receiving interface
129 a delay value interface
130 a display
140 a mobile computing device
140', 140" a mobile computing device
142 a wireless data network interface
144 a headphone interface 146 an audio delayer
150 a headphone
150', 150" a headphone
162 a wireless data network connection
164 a video connection

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 illustrates an audio/video system 100. The system 100 comprises a media stream source 110, such as an optical disc player, such as a Blu-ray player, or a memory device, such as an USB stick, or a computer connected to the internet, or the like. The system 100 comprises an audio forwarding device 120. Audio forwarding device 120 is connected to media stream source 110 for receiving a media stream. The media stream comprises a video and at least one audio stream. The media stream may also comprise multiple video streams. Audio/video system 100 comprises a display 130. Display 130 may be television, such as an LCD television, or a monitor, such as a computer monitor. Typically, display 130 will be part of a home entertainment system. For example, display 130 may be situated in a living room where it can be watched by multiple people. Audio/video system 100 comprises a mobile computing device 140. Mobile computing device 140 may be a mobile phone, such as a smart phone, or a table, or the like. Mobile computing device 140 is connectable to a headphone 150. FIG. 1 shows mobile computing device 140 currently connected to a headphone 150. Headphone 150 may be a headset comprising a headband for positioning one or usually two loudspeakers for one respectively two ears. Headphone 150 may be an ear set comprising one or usually two loudspeakers for placement in one respectively two ears. Preferably, headphone 150 may be connected and disconnected at will. The connection between headphone 150 and mobile computing device 140 could also be made permanent however.

Audio forwarding device 120 is connected to display 130 through a video connection 164. Typically, video connection 164 is a wired connected, say a cable running between audio forwarding device 120 and display 130, for example an HDMI cable. Audio forwarding device 120 is connected to mobile computing device 140 through a wireless data network connection 162. The wireless data network connection may be a packetized digital connection, typically having error detection possibly having a re-transmission system in case of transmission error. Preferably an encoding for high data transmission is used, such as PSK encoding. For example, wireless data network connection 162 may be a WI-FI connection.

During operation audio forwarding device 120 receives a media stream from media stream source 110. The media stream contains audio and video. The audio and video streams are synchronized, at least to an extent. The synchronization may be implicit, for example, because the video and audio are interleaved, thus indicating what audio goes with what video. The synchronization may also be explicit, for example, the video and audio stream may contain timestamps. For example, a timestamp in the video stream may indicate that the corresponding part of the video corresponds to a part in the audio stream that corresponds to the same timestamp.

Audio forwarding device 120 forwards at least the video stream of the media stream to display 130. Audio forwarding device 120 may also forward the entire media stream to display 130. Audio forwarding device 120 obtains the audio stream from the media stream. Audio forwarding device 120 encodes the audio stream in a format suitable for wireless transmission to mobile computing device 140. Note that audio forwarding device 120 does not forward the video to mobile computing device 140, this will greatly reduce bandwidth. Thus the latency and reliability is increased. Note that audio forwarding device 120 may recode the audio to reduce delays caused by the wireless transmission, i.e., reduce that amount of data to be transmitted to mobile computing device 140. For example, audio forwarding device 120 may recode with higher compression and/or with lower sampling frequency and/or reducing stereo to mono. Delay introduced by recoding preferably is lower than the time gained by transmitting fewer bits, this may be verified by direct experiment. Operations that reduce the amount of data with relatively little processing are likely to have the greatest impact, e.g., reducing stereo to mono. Mobile computing device may send a message to audio forwarding device 120 indicating that the delay caused by the wireless connection is too large to preserve synchronization. In that case device 120 may increase the size reduction, e.g., discarding more languages from the audio streams.

Audio forwarding device 120 sends the audio stream to mobile computing device 140 over wireless connection 162. The wireless connection between audio forwarding device 120 and mobile computing device 140 may have been established earlier. Mobile computing device 140 receives the audio stream, if needed mobile computing device 140 processes the received stream, e.g., to control volume, equalizer settings, etc, and plays the stream to headphone 150.

Typically, mobile computing device 140 will run software that controls the connection with audio forwarding device 120, the receiving of the audio stream, the optional processing, and the playing. For example, said playing software may allow the user to control the process. For example, the mobile computing device 140 may allow the sound to be temporarily muted, etc.

Figure 2A:
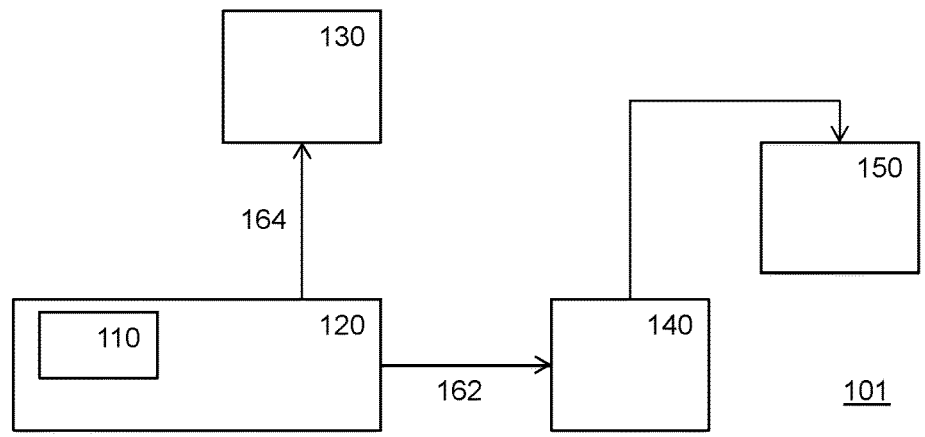
Figure 2B:
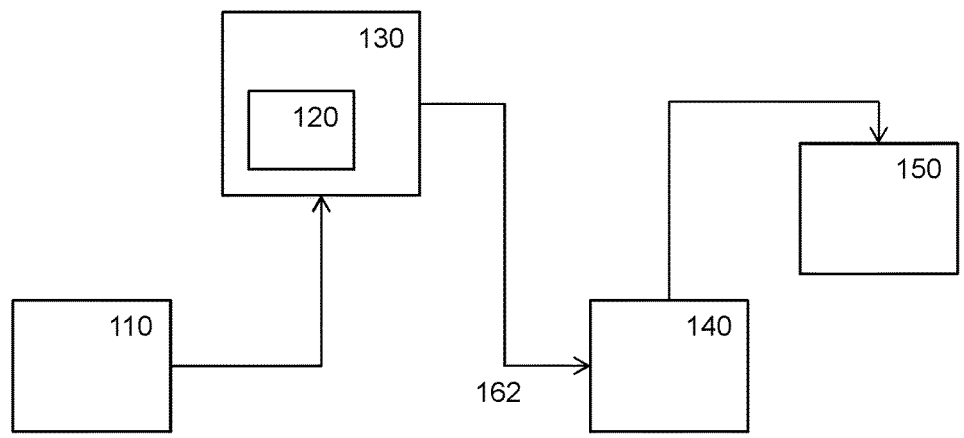

FIGS. 2a and 2b illustrate alternative arrangement of media stream source 110, audio forwarding device 120 and display 130 in audio/video systems 101 and 102. FIG. 2a shows audio forwarding device 120 comprising media stream source 110. In this case the media stream may be directly produced in audio forwarding device 120. FIG. 2b shows audio forwarding device 120 comprised in display 130. Connection video connection 164 is now internal to display 130.

FIG. 2a is advantageous, as it allows a media player, say an optical disc player, that has an additional functionality, i.e., streaming the audio corresponding to the video to mobile computing device 140, e.g., to a smart phone. Such a player would be preferable to a player without this functionality, since the user may enjoy say any movie with private audio.

FIG. 2b is also advantageous as is allows a display, say a television, to stream any audio corresponding to the video currently being displayed to be streamed to a mobile computing device, say a smart phone. Note that display 130 may suppress all sound, so that it sound is the least disturbing. However, it may also stream only to one or more selected users, since they desire an alternative, e.g. increased, volume setting or a different language as the other users of display 130.

Note that FIGS. 2a and 2b may be combined, i.e., also media stream source 110 may be comprised in display 130.

Figure 3:
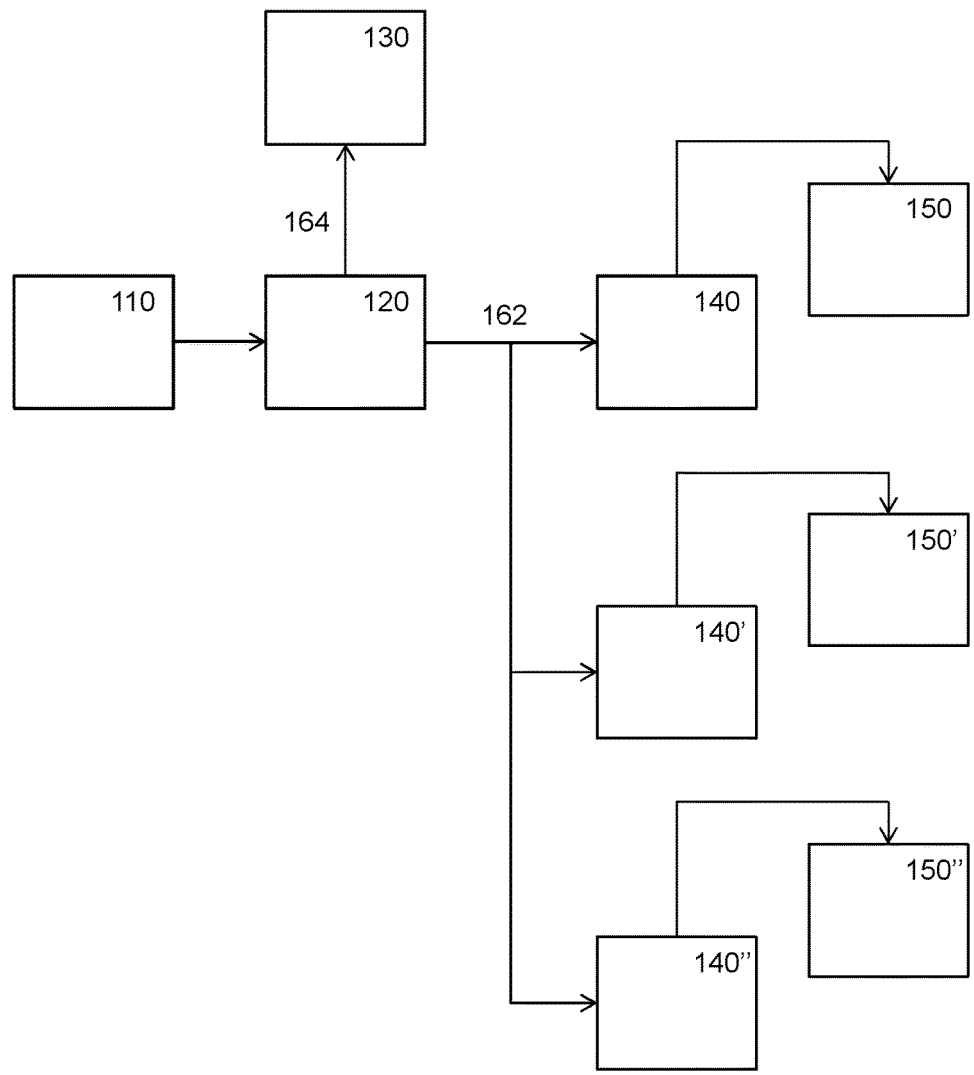

FIG. 3 illustrates audio/video system 103, yet another variant of audio/video system 100. FIG. 3 shows multiple mobile computing devices, 140, 140' and 140", but two or more than 3 is also possible. Audio forwarding device 120 is connected wirelessly to each one of the multiple mobile computing devices. Audio forwarding device 120 may be connected over multiple individual connections. Audio forwarding device 120 may also broadcast to the multiple devices.

For example, the media stream may contain multiple audio streams, say for multiple languages. Audio forwarding device 120 may send a different audio stream to a different device. For example, a mobile computing device may communicate to audio forwarding device 120 which audio stream it wants to receive. Audio forwarding device 120 may also forward all audio streams to all devices. In this case, the user may make a selection on which stream to listen to locally on the mobile computing device. Audio forwarding device 120 may also discard some streams, i.e., streams nobody is interested in, and broadcast the other streams to the multiple devices. This reduces bandwidth, optimizes latency, since it avoids multiple connections, yet allows each user to listen to an audio stream of its choice.

In an advantageous implementation, the audio forwarding device is configured with a default language. The audio forwarding device forwards the original language and the default language and discards all others. In that situation each individual user may select the dubbed or original version of audio.

The multiple mobile computing devices need not all be of the same type. They may run different software to connect to audio forwarding device 120.

Figure 4:
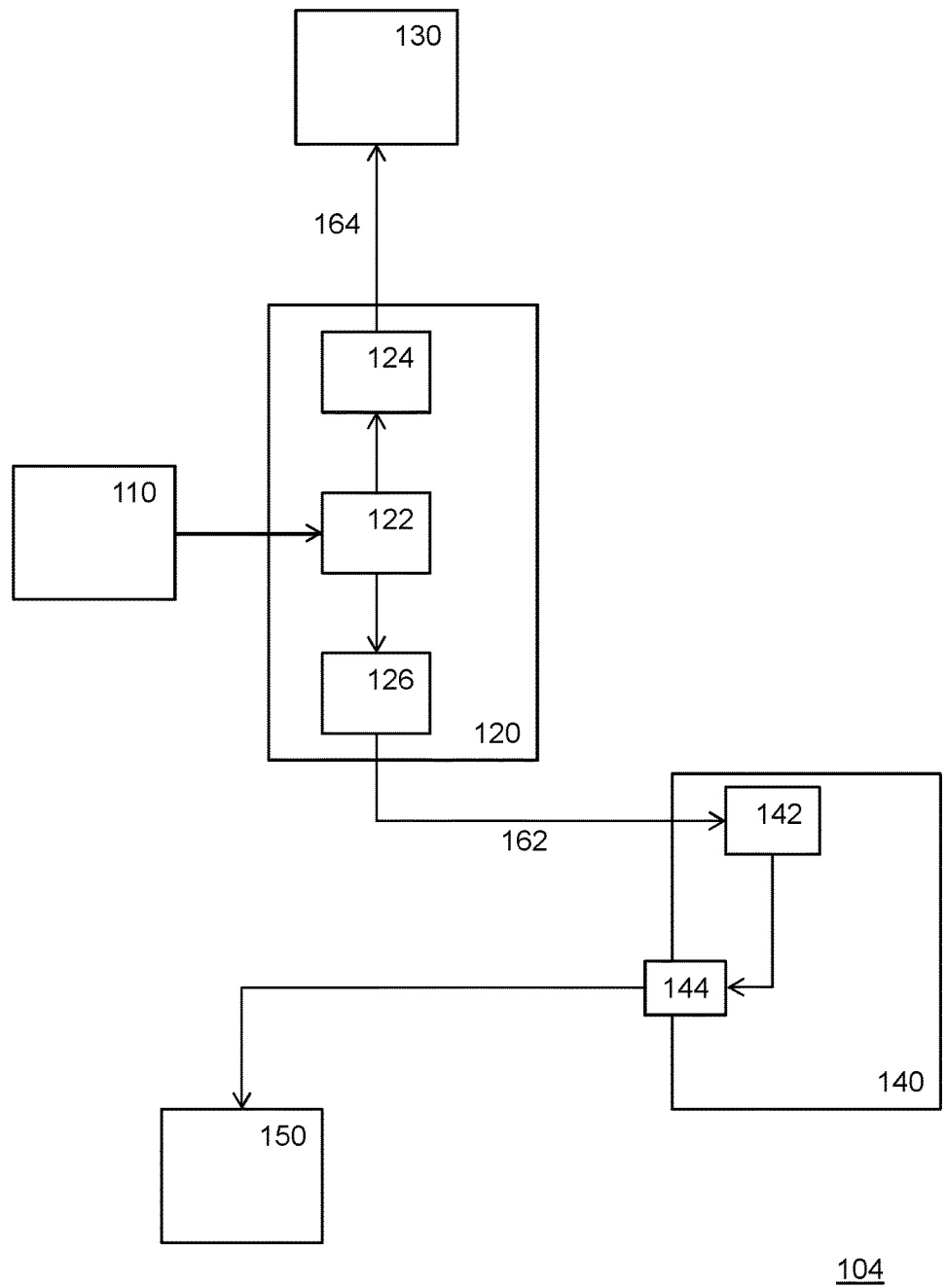

FIG. 4 shows system 104 which is a possible implementation of system 100. Modified appropriately the implementation details given for system 104 may also be used in systems 100-103.

Audio forwarding device 120 comprises a media interface for receiving a media stream from media stream source 110. For example, interface 110 may comprise a jack for connecting a cable. Audio forwarding device 120 comprises a display interface for connecting audio forwarding device 120 to display 130 for streaming video to the display. Audio forwarding device 120 comprises a wireless data network interface 126 for wireless digital connection to a mobile computing device. Mobile computing device 140 comprises a corresponding wireless data network interface 142. Interfaces 126 and 142 are compatible in the sense that an audio stream sent by audio forwarding device 120 may be received by mobile computing device 140. Mobile computing device 140 comprises a headphone interface 144, say a headphone jack for receiving a plug of headphone 150. Headphone interface 144 may also be a Bluetooth interface for connecting mobile computing device 140 with a Bluetooth headphone. Mobile computing device 140 and headphone 150 may be connected through a wire.

During operation, audio forwarding device 120 receives a media stream at media interface 122, and obtains the audio stream therefrom. The audio stream is forwarded to mobile computing device 140 through wireless data network interface 126. The video stream is forwarded to display 130 through display interface 124. Mobile computing device 140 receives the audio stream through wireless data network interface 142, and plays it through headphone interface 144.

For example, the audio forwarding device 102 may comprise an audio separator (not separately shown) configured to obtain the audio stream from the media stream separate from the video stream. For example, the separator may integrated in interface 122.

Figure 5:
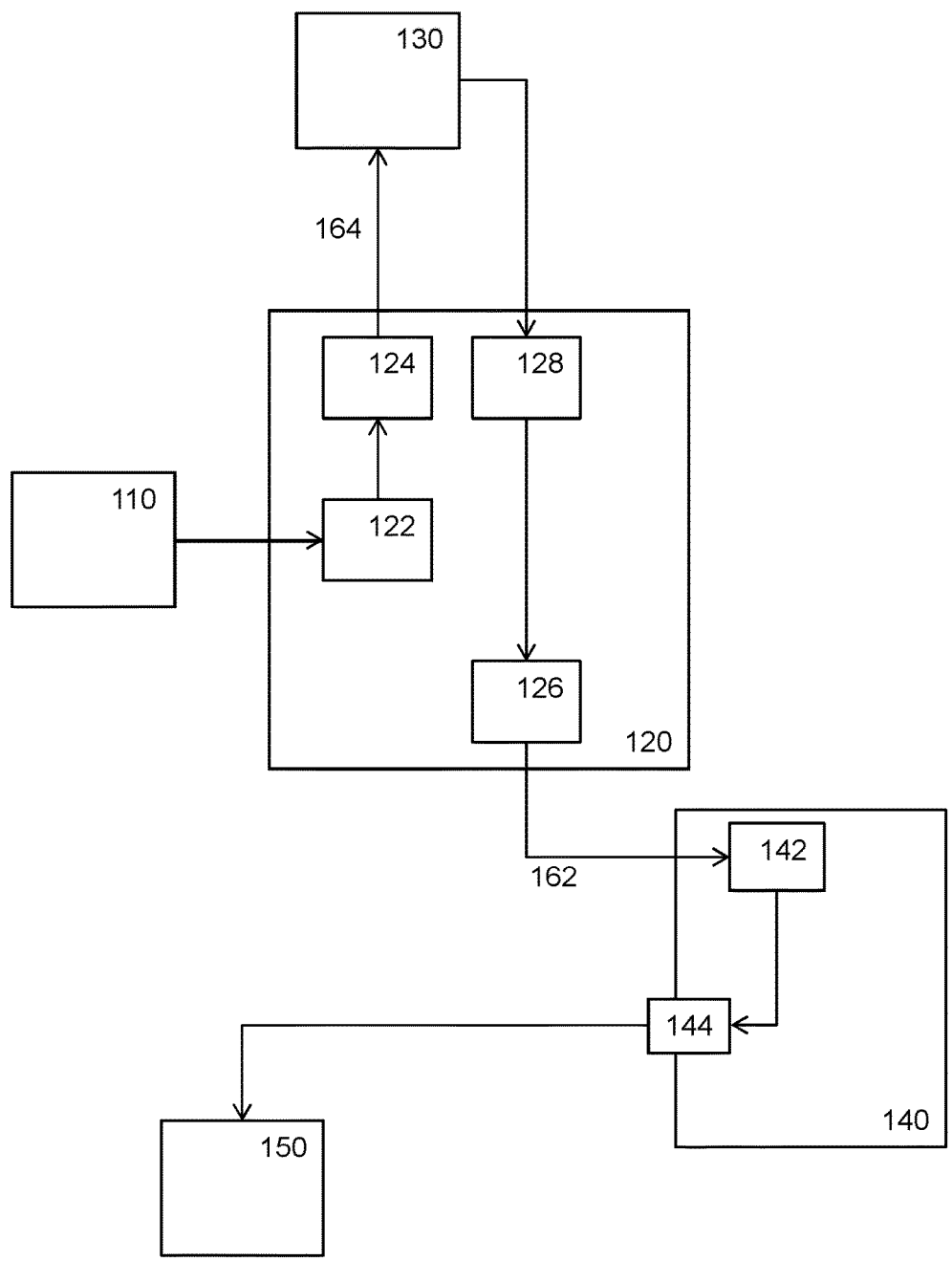

FIG. 5 shows system 105 which is a possible implementation of system 100. Modified appropriately the implementation details given for system 104 also be used in systems 100-103.

Audio forwarding device 120 comprises an audio receiving interface 128. Media interface 122 is configured to forward the media stream to display 130 including both the audio and video stream. Thus synchronization present in the media stream between the video and audio stream is preserved. Display 130 is configured to process the media stream, introducing a delay between receiving the media stream and displaying the video stream. For example, the delay may be caused by processing the image, to improve color, reduce noise and the like. The audio stream is delayed by display 130 by the same amount and forwarded to audio forwarding device 120. Display device 130 may or may not play the audio stream. Audio forwarding device 120 receives the audio stream at audio receiving interface 128. The audio stream received at audio receiving interface 128 is synchronized with the video currently displayed at display 130. Audio forwarding device 120 then forwards the audio stream to mobile computing device 140 through wireless data network interface 126. The wireless connection will introduce a delay. In a well working wireless connection this delay could lie within the range for being imperceptible by ordinary users. However, even if the wireless transmission is less than optimal, the delay may stay within acceptable bounds. Note that in the latter case, the transmission may be improved by reducing the amount of data in the audio stream.

Figure 6:
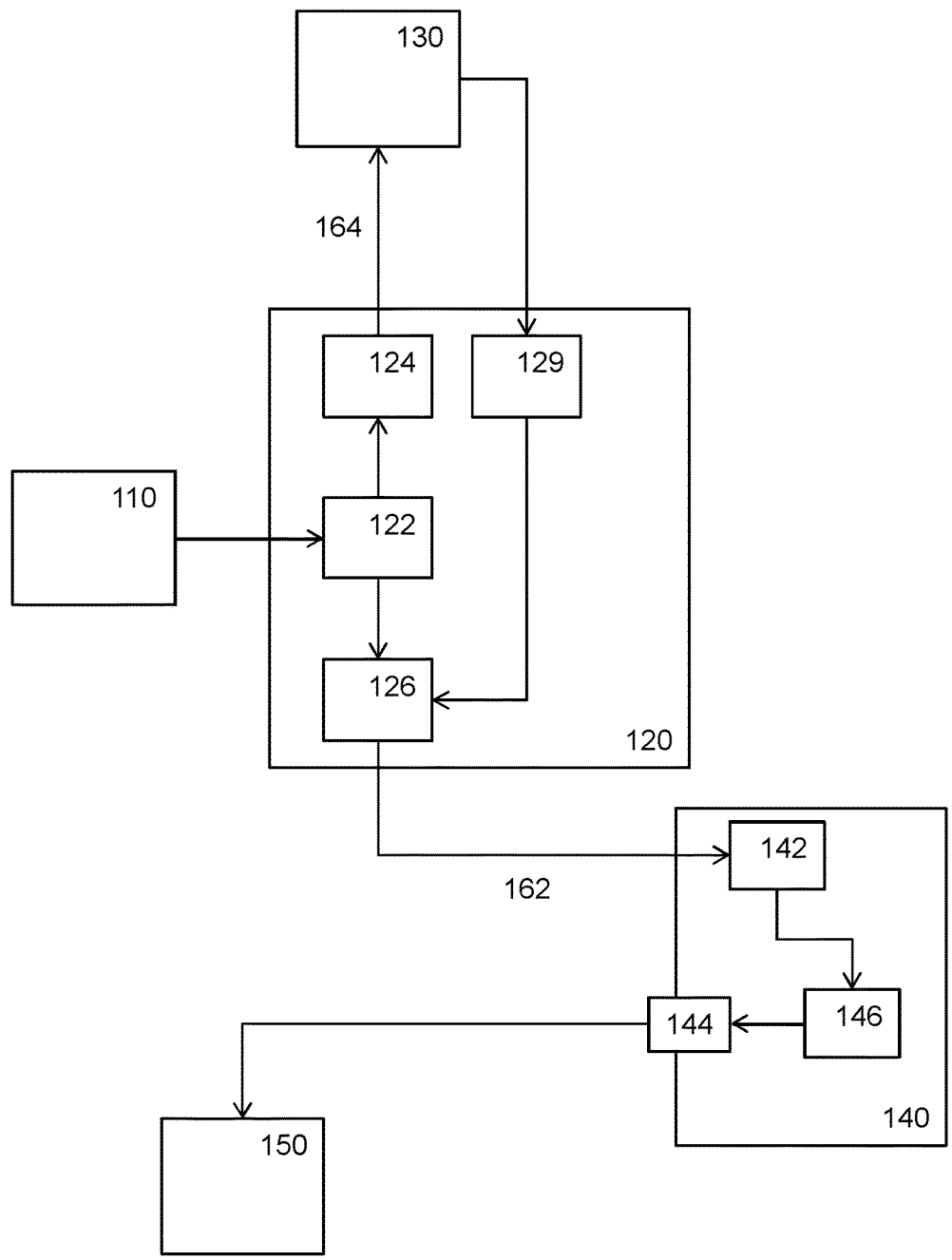

FIG. 6 shows system 106 which is a possible implementation of system 100. Modified appropriately the implementation details given for system 104 also be used in systems 100-103. Audio forwarding device 120 comprises a delay value interface 129. Display 130 is configured to send to audio forwarding device 120 a value in digital form which represents the delay between receiving the video stream by the display and displaying the video stream on the display.

Audio forwarding device 120 is configured to receive this value through delay value interface 129. The delay value may be used in various ways. For example, the audio forwarding device 120 may send the delay value through wireless data network interface 126 to mobile computing device 140. Mobile computing device 140 in turn may comprise an audio delayer 146 for delaying playing of the audio stream to synchronize with the display of the video stream. Audio delayer 146 delays the audio stream by the delay value minus a wireless connection delay. The wireless connection delay may be determined by audio forwarding device 120 and mobile computing device 140 executing a suitable protocol. For example, mobile computing device 140 may run the 'ping' protocol to find the round trip time of a packet going from mobile computing device 140 to audio forwarding device 120 and back (or audio forwarding device 120 may execute this protocol). Half the round trip time will typically correspond to a delay introduced by wireless connection. Audio forwarding device 120 or mobile computing device 140 may repeat the protocol, say every predetermined amount of time, say every 5 minutes. The roundtrips times may be average over multiple round trips, say over 5 round trips.

Advantageously, determining the wireless delay may be combined with streaming the audio stream. For example, upon receiving a packet of the audio stream, mobile computing device 140 may respond by acknowledging the packet to audio forwarding device 120. The acknowledgement may include data identifying the packet, say part of the packet, or a hash over the packet etc. By subtracting the time at which audio forwarding device 120 receives the acknowledgement and time at which audio forwarding device 120 send the packet, audio forwarding device 120 may determine the roundtrip time. Half the roundtrip time (or half the average) corresponds to the wireless delay. The wireless delay may be transmitted to audio forwarding device 120 over wireless data network interface 126. Audio delayer 146 may then delay by the delay of display 130 minus that of the wireless delay. If the latter subtraction is negative, mobile computing device 140 may opt to not delay at all.

Figure 7:
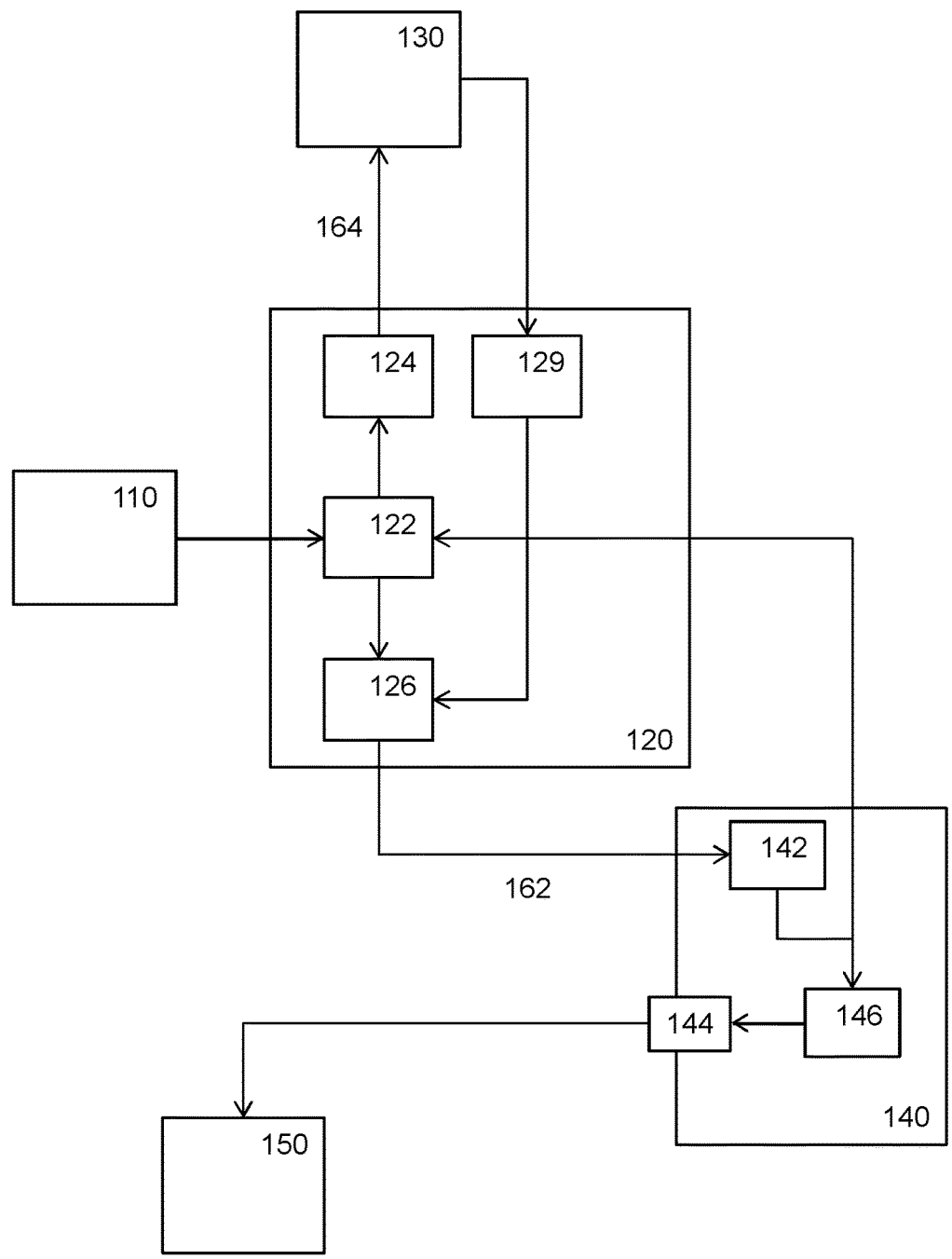

FIG. 7 shows a variant in which audio delayer 146 reports to media interface 122 that the subtraction is negative. In that case media interface 122 delays forwarding of the video stream to display 130, e.g. by a corresponding amount, possibly increased with a predetermined percentage as a safety measure.

Finally, audio forwarding device 120 may contain a synchronizer configured to produce a synchronizing data stream for synchronizing the audio stream during playing on the mobile computing device with the displaying of the video stream on the display. For example, timestamps may be introduced, possibly in or along one or both of the audio and the video stream.

Synchronization data may also be present in the media stream. In that case audio forwarding device 120 may forward the existing synchronization data to display 130 and mobile computing device 140.

Typically, the audio forwarding device 120 and the mobile computing device 140 each comprise a microprocessor (not shown) which executes appropriate software stored at the device audio forwarding device 120 and the mobile computing device 140, e.g. that the software may have been downloaded and stored in a corresponding memory, e.g. RAM (not shown) or non-volatile memory such as flash. For example mobile computing device 140 may download the software as a so-called 'app'. The devices 110 and 130 may also be equipped with microprocessors and memories (not shown).

Figure 8:
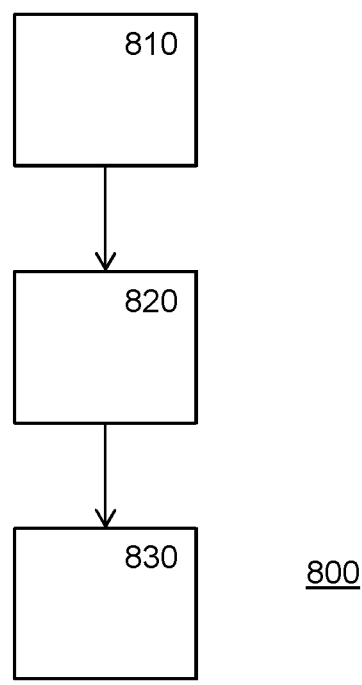
FIG. 8 is a flow chart illustrating an audio forwarding method.

FIG. 8 shows as a schematic flow chart a method 800 of forwarding audio. FIG. 8 shows step 810 comprising receiving a media stream, the media stream comprising a video stream and an audio stream, the audio stream being synchronized with the video stream; step 820 comprising transmitting the video stream to a display for display of the video stream; and step 830 comprising streaming the audio stream in the form of digital data to a mobile computing device over a digital wireless data connection. Step 810, 820 and 830 are typically executed by an audio forwarding device 120.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 810, 820 and 830 may be executed, at least partially, in parallel. Moreover, a given step may not have finished completely before a next step is started.

A method according to the invention may be executed using software, which comprises instructions for causing a processor system to perform method 800. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An audio forwarding device comprising:
    a media interface configured to receive a media stream, the media stream comprising a video stream and an audio stream, the audio stream being synchronized with the video stream;
    a display interface wire connected to a display and configured to transmit the video stream to the display for display of the video stream;
    a wireless data network interface configured to stream the audio stream in a form of digital data by wireless transmission to a mobile computing device over a digital wireless data connection for the mobile computing device to play the audio stream on a headphone interface; and
    a delay value interface configured to receive from the display the delay value in digital form, representing the delay between receiving the video stream the by the display and displaying the video stream on the display, wherein the audio forwarding device comprises a processor configured to forward the delay value to the mobile computing device through the wireless data network interface, perform a delay determining protocol with the computing device to establish a wireless delay value representing the delay of the audio stream through the wireless connection, the mobile computing device comprising an audio delayer configured to delay playing of the audio stream by the delay value minus the wireless connection delay and when the latter subtraction is negative, then the audio delayer is configured to report to the media interface that the subtraction is negative and the media interface is configured to delay forwarding of the video stream to the display by a corresponding amount.

2. The audio forwarding device of claim 1, comprising a synchronizer configured to produce a synchronizing data stream for synchronizing the audio stream during playing on the mobile computing device with the displaying of the video stream on the display, the wireless data network interface being configured to stream the synchronizing data stream to the mobile computing device over the digital wireless data connection together with the audio stream.

3. The audio forwarding device of claim 2, wherein the audio forwarding device is configured to stream the synchronizing data stream to the display together with the video stream.

4. The audio forwarding device of claim 2, wherein the synchronizing data stream comprises timestamps.

5. The audio forwarding device of claim 1, comprising a media stream source for producing the media stream.

6. A display configured to display the video stream comprising the audio forwarding device of claim 1.

7. An audio/video system comprising:
a media source for producing a media stream comprising a video stream and an audio stream, the audio stream being synchronized with the video stream;
an audio forwarding device comprising:
  a media interface configured to receive the media stream, wherein the audio forwarding device is configured to receive the media stream from the media source at the media interface of the audio forwarding device;
  a display interface wire connected to a display and configured to transmit the video stream to the display for display of the video stream;
  a wireless data network interface configured to stream the audio stream in a form of digital data by wireless transmission to a mobile computing device over a digital wireless data connection for the mobile computing device to play the audio stream on a headphone interface; and
  a delay value interface configured to receive from the display the delay value in digital form, representing the delay between receiving the video stream by the display and displaying the video steam on the display,
wherein the audio forwarding device comprises a processor configured to forward the delay value to the mobile computing device through the wireless data network interface, perform a delay determining protocol with the computing device to establish a wireless delay value representing the delay of the audio stream through the wireless connection, the mobile computing device comprising an audio delayer configured to delay playing of the audio stream by the delay value minus the wireless connection delay and when the latter subtraction is negative, then the audio delayer is configured to report to the media interface that the subtraction is negative and the media interface is configured to delay forwarding of the video stream to the display by a corresponding amount;
the display configured to receive the video stream from the display interface wire of the audio forwarding device for display of the video stream; and
the mobile computing device comprising:
  the wireless data network interface for receiving the audio stream from the audio forwarding device;
  the headphone interface for connecting a headphone to the mobile computing device; and
  an audio player for obtaining the audio stream from the wireless data network interface of the mobile computing device and for playing the audio stream on the headphone interface.

8. A method for audio forwarding comprising acts of:
receiving a media stream, the media stream comprising a video stream and an audio stream, the audio stream being synchronized with the video stream;
transmitting the video stream through a wired video connection to a display for display of the video stream;
streaming the audio stream in a form of digital data to a mobile computing device over a digital wireless data connection for the mobile computing device to play the audio stream on a headphone interface;
receiving from the display a delay value in digital form representing a delay between receiving the video stream by the display and displaying the video stream on the display,
the audio forwarding device
  forwarding the delay value to the mobile computing device through the wireless data network interface, and
  performing a delay determining protocol to establish a wireless delay value representing the delay of the audio stream through the wireless connection; and
delaying playing of the audio stream by the delay value minus the wireless connection delay by an audio delayer of the mobile computing device and when the subtraction is negative, then the audio delayer reporting to the media interface that the subtraction is negative and the media interface delaying forwarding of the video stream to the display by a corresponding amount.

9. A non-transitory computer readable medium comprising computer code instructions which, when executed by a processor, configure the processor to perform acts of:
receiving a media stream, the media stream comprising a video stream and an audio stream, the audio stream being synchronized with the video stream;
transmitting the video stream through a wired video connection to a display for display of the video stream;
streaming the audio stream in a form of digital data to a mobile computing device over a digital wireless data connection for the mobile computing device to play the audio stream on a headphone interface;
receiving from the display a delay value in digital form representing a delay between receiving the video stream by the display and displaying the video stream on the display,
the audio forwarding device
  forwarding the delay value to the mobile computing device though the wireless data network interface, and
  performing a delay determining protocol to establish a wireless delay value representing the delay of the audio stream through the wireless connection; and delaying playing of the audio stream by the delay value minus the wireless connection delay by an audio delayer of the mobile computing device and when the subtraction is negative, and the audio delayer reporting to the media interface that the subtraction is negative and the media interface delaying forwarding of the video stream to the display by a corresponding amount.

10. A display configured to send to the audio forwarding device of claim 1 the delay value.

* * * * *